US 8,668,078 B2

(12) United States Patent
Horn

(10) Patent No.: US 8,668,078 B2
(45) Date of Patent: Mar. 11, 2014

(54) CLEAN, HIGH DENSITY, SOFT-ACCUMULATING CONVEYOR

(75) Inventor: George W. Horn, Manno (CH)

(73) Assignee: Middlesex General Industries, Inc., Woburn, MA (US)

(*) Notice: Subject to any disclaimer, the term of this patent is extended or adjusted under 35 U.S.C. 154(b) by 337 days.

(21) Appl. No.: 13/218,576

(22) Filed: Aug. 26, 2011

(65) Prior Publication Data

US 2011/0303510 A1 Dec. 15, 2011

Related U.S. Application Data

(63) Continuation-in-part of application No. 12/432,129, filed on Apr. 29, 2009, now Pat. No. 8,033,383.

(60) Provisional application No. 61/125,901, filed on Apr. 29, 2008.

(51) Int. Cl.
*B65G 13/06* (2006.01)
*B65G 23/04* (2006.01)

(52) U.S. Cl.
USPC .......................... 198/606; 198/817; 198/781.1

(58) Field of Classification Search
None
See application file for complete search history.

(56) References Cited

U.S. PATENT DOCUMENTS

| 3,089,660 | A | * | 5/1963 | Bilane ...................... 242/532.6 |
| 3,967,721 | A | * | 7/1976 | Rhoden ........................ 198/835 |
| 5,038,923 | A |   | 8/1991 | Evans |
| 5,062,368 | A |   | 11/1991 | Sticht et al. |
| 6,047,812 | A |   | 4/2000 | Horn et al. |
| 6,234,303 | B1 | * | 5/2001 | Gales et al. .................. 198/817 |
| 6,321,586 | B1 |   | 11/2001 | Wojtowicz et al. |
| 6,659,264 | B2 | * | 12/2003 | Pelka ........................... 198/456 |
| 6,820,736 | B2 | * | 11/2004 | Itoh et al. ................. 198/781.01 |
| 2006/0151297 | A1 |   | 7/2006 | Pyke et al. |

* cited by examiner

*Primary Examiner* — Kavel Singh
(74) *Attorney, Agent, or Firm* — Preti Flaherty Beliveau & Pachios LLP

(57) ABSTRACT

A conveyor segment for clean manufacturing applications. Each conveyor belt segment includes a pair of side rails parallel to each other; a pair of belt-drives for transporting work pieces from a first end to a second end of the belt segment; a pair of driving wheels for turning the belt-drives. The belt of each of the belt-drives is disposed in a serpentine path about plural, load-bearing upper idler wheels, around either a lower loop-back idler wheel or a driving wheel, and back up and around another pair of upper idler wheels. This sequence is repeated a selected number of times about additional pairs of upper idler wheels and lower loop-back idler wheels or a driving wheel before the belt is disposed beneath plural return idler wheels and back up to the starting point. Slipping between the belt and wheels is thus minimized, even in the absence of a work piece on the belt segment.

12 Claims, 9 Drawing Sheets

CLEAN, HIGH DENSITY, SOFT-ACCUMULATING CONVEYOR

CROSS REFERENCE TO RELATED APPLICATIONS

The present utility patent application is a continuation-in-part of U.S. patent application Ser. No. 12/432,129, filed Apr. 29, 2009 and entitled "Clean, High Density, Soft-Accumulating Conveyor," which claims the benefit of priority through U.S. Provisional Patent Application No. 61/125,901, dated Apr. 29, 2008 and entitled "Clean, High Density, Soft-Accumulating Conveyor".

STATEMENT REGARDING FEDERALLY SPONSORED RESEARCH OR DEVELOPMENT (Not applicable)

BACKGROUND OF THE INVENTION

In some industrial applications of conveyors there are a number of special performance requirements in addition to common parameters such as speed, weight, and transport capacity. Such applications can be found in the Semiconductor, Pharmaceutical, Solar Cell, Hard Disk Drive, Flat Panel Display, and other manufacturing industries. For these applications and other similar applications, the conveyors used for inter-tool movement of Work In Process (WIP), require "Particulate Free Cleanliness", "Vibration Free Transport", "Very High Density WIP Flow", and "Asynchronous Movements of Pallets with Soft-Accumulation of WIP" (i.e., without collisions or bumping).

Of the above four requirements, current technology has provided for cleanliness, for asynchronous movement, and for soft-accumulation of WIP, e.g., using precisely guided WIP on rollers, driven by motors coupled to the wheels via magnetic hysteresis. See, e.g., U.S. Pat. Nos. 4,793,262 and 6,047,812. Conventionally, a conveyor transporting mechanism consists of a series of wheels supporting and driving a multiplicity of WIP pallets on each of two parallel sides. A magnetic hysteresis coupling allows the driving wheels under a WIP to disengage from the drive shaft of the motor if the inertia of the WIP does not permit synchronization of WIP pallets with the drive speed during acceleration or deceleration, to avoid the squealing of tires.

Advantageously, magnetic hysteresis coupling reduces rubbing motion between driving wheels and WIP pallets, which could otherwise generate particulates that would adversely impact the clean transport requirement. Furthermore, magnetic hysteresis coupling, in combination with segmentation of the conveyor, provides soft accumulation, i.e., without bumping, of WIP pallets because the WIP pallets are guided by presence-of-WIP sensors that define the boundaries of segments on a conveyor that can be occupied by one and only one WIP pallet.

A fundamental drawback of current technology is that the supporting (idling) and driving wheels generate minute vibrations during transport and, therefore, are not able to meet the "vibration-free" requirement. Several physical factors are the cause. First is the near impossibility of manufacturing a large number of wheels to an absolute same diameter and concentricity. Another factor is the practical impossibility of disposing and positioning the wheels to form a straight line, so that any perfectly-planar WIP pallet riding on it would concurrently touch all of the wheels thereunder.

A further drawback of existing practice is a limitation in achieving very high density WIP flow due to relatively moderate acceleration and deceleration rates of the WIP. High density WIP flow requires a relatively close spacing of pallets that travel at high speed. To achieve this in a collision-free environment and in which pallets may move asynchronously of each other requires relatively high acceleration and deceleration rates in case one pallet, for whatever reason, slows or stops.

The physical cause of this drawback is the limited surface contact between WIP pallet undersides and driving wheels necessary for frictional adhesion. Indeed, the friction coefficient of soft or deformable materials is surface area dependent, while hard or more rigid surfaces is less so. As a result, low settings to initiate early disengagement of the magnetic hysteresis drive or clutch, would be necessary, to prevent the spinning of the driving wheels under the pallet during an acceleration mode in which the rubber tires of the clutch-driven wheels are in direct contact with the underside of the driven pallet.

However, low-torque clutch settings cancel higher acceleration rates of the motor driving the clutch. Consequently, high speed and high density of the pallet flow is not currently achievable. Instead, it is important to be able to start a pallet from a standing still position quickly and to stop the same pallet traveling in a high-speed transport mode just as quickly, to maintain the high density of flow.

The need for asynchronous movement of the pallets also necessitates being able to transport each pallet individually if there is space to move the pallet downstream and/or to stop a pallet independently and without bumping if another downstream pallet is obstructing its way. In short, high speed and high density flow, together, require a firm grip on the pallet during its movements. However, individual driving wheels, with the limited surface contact area with the WIP pallet, currently are not able to deliver this performance.

To address these shortcomings, existing conveyor segments, which are structured and arranged to be slightly larger then a WIP or a WIP pallet, can, instead, be equipped with a dedicated drive belt, riding on top of wheels that are independently driven by the same hysteresis clutch/motor mechanism as before. The high-friction belt, sandwiched between the wheels and the WIP pallets, provides necessary adhesion between the WIP pallet and the driving, return idler, and/or idler wheels, to ensure required high, slip-free acceleration. Furthermore, the belt, which is riding on top of the previously disclosed wheels, reduces vibrations generated by any uneven height differences of sequential wheels.

Disadvantageously, generic belt-driven conveyors are not inherently clean. Hence, merely adding belt drives may impact a particulate-free environment. As a result, maintaining a high degree of cleanliness in a belt-driven environment requires special wheel and belt designs.

Accordingly, it would be desirable to provide a high density, high speed, asynchronous belt-driven conveying system that is particulate-free, vibration-free, and that employs soft accumulation.

SUMMARY OF THE INVENTION

A first belt-driven conveyor includes a flat, thin belt in combination with crowned hysteresis driving wheels and flanged idler wheels. Each driving wheel is structured and arranged to drive and center the flat, thin belt while the idler wheels are structured and arranged to laterally confine the work piece or the object carrying the work piece using the flanges on the idler wheels. A magnetic hysteresis clutch or coupling allows the driving wheels for the belt to disengage from the drive shaft of the motor whenever the inertia of a work piece or object carrying a work piece does not permit synchronization of the work piece or the object carrying the work piece with the drive speed during acceleration or deceleration. Indeed, the clutch setting is pre-programmed or keyed so that it does not exceed the friction force between the belt and the work piece or the object carrying the work piece. When the acceleration exceeds this setting, the work piece or the object carrying the work piece is decoupled from the motor.

A relatively thin belt thickness is desirable because, although idler wheels rotate at the same rate, those portions of the idler wheel closer to the axis of rotation, i.e., at or near the root, rotate more slowly relative to portions of the idler wheel that are disposed farther from the axis of rotation. As a result, any difference in the velocities of two surfaces on the flange that contact the work piece or object carrying the work piece may result in undesirable rubbing and resulting frictional particulation. Consequently, relatively thin, relatively flat belt cross sections are more desirable, to reduce the velocity differential between potential points of contact and to maintain required cleanliness levels.

In a second system, a relatively thicker belt having a raised edge, i.e., an L-shaped belt, is used to laterally confine the work piece or object carrying the work piece. In this embodiment, each of the driving wheels and the return idler wheels are machined to include crowns on the outer peripheral surface on which the belt travels. The center of the crown radius machined on the driving wheels and on the return idler wheels, however, is slightly offset relative to the centerline of the belt by a distance x. This offset centers the L-shaped belts whose belt dimensions, e.g., the cross-section, are not uniform.

A third system is effected by eliminating the flanges of the idler wheels altogether. More specifically, a third belt-driven conveyor includes a belt having a rounded or substantially rounded cross-section in combination with hysteresis-clutch driving wheels having negative crowns and idler wheels having negative crowns and guide flanges.

Each of the three embodiments described above divides the conveyor into modules that include one or more segments. Belt segments are the smallest element of the whole and are dimensioned to handle and to transport a single work piece or object carrying the work piece at a time. Each belt segment includes a sensor(s) that is/are adapted to confirm the presence or absence of a discrete work piece or the object carrying the work piece within the belt segment. Currently, movement of an upstream work piece or an object carrying the work piece is realized only when one or more sequential downstream belt segments is/are completely unoccupied. Hence, forward movement of an upstream work piece or an object carrying the work piece does not begin until downstream segments are totally unoccupied. This, then, defines a velocity-independent minimum distance between work pieces or objects carrying work pieces.

However, this approach affects work piece density, by delaying the forward movement of an upstream work piece or of the object carrying the work piece until a clear signal is received from a downstream belt segment sensor. This limitation becomes important once higher accelerations and decelerations are implemented. In this manner, the addition of soft belts becomes an enabling technology for higher density, higher speed, asynchronous, bump-free flow of work pieces or objects carrying the work pieces.

A further improvement to current technology is obtained by sensing the precise location of each of the work pieces or of the objects carrying work pieces during movement by including more sensors or other feedback means along the path(s) of the moving work pieces or objects carrying work pieces. Data signals from more sensors increase the granularity of conveyor segmentation, which then becomes virtually finer than the size of the work piece or the object carrying the work piece. At the extreme, if various technologies are applied to the conveyor to locate moving work pieces or objects carrying the work pieces more precisely, higher work piece density at higher flow speeds can be achieved, while maintaining the asynchronous, bump-free, movement requirements.

Yet another improvement of the presently disclosed arrangement is achieved through the use of a serpentine belt path, thereby urging the belt into continuous rolling contact with idler and driving wheels and avoiding irregular and intermittent contact between the belt and the driving and idler wheels, particularly when the belt in the respective region is unloaded.

Also, improvements are obtained in the presently disclosed system when belt aligning crowns are disposed, not on driven wheels, but on idler wheels which may define the serpentine belt path and on idler wheels defining the belt return path.

BRIEF DESCRIPTION OF THE DRAWINGS

The invention is pointed out with particularity in the appended claims. However, the advantages of the invention described above, together with further advantages, may be better understood by referring to the following description taken in conjunction with the accompanying drawings. The drawings are not necessarily drawn to scale, and like reference numerals refer to the same parts throughout the different views.

DETAILED DESCRIPTION OF THE INVENTION

Figure 1:
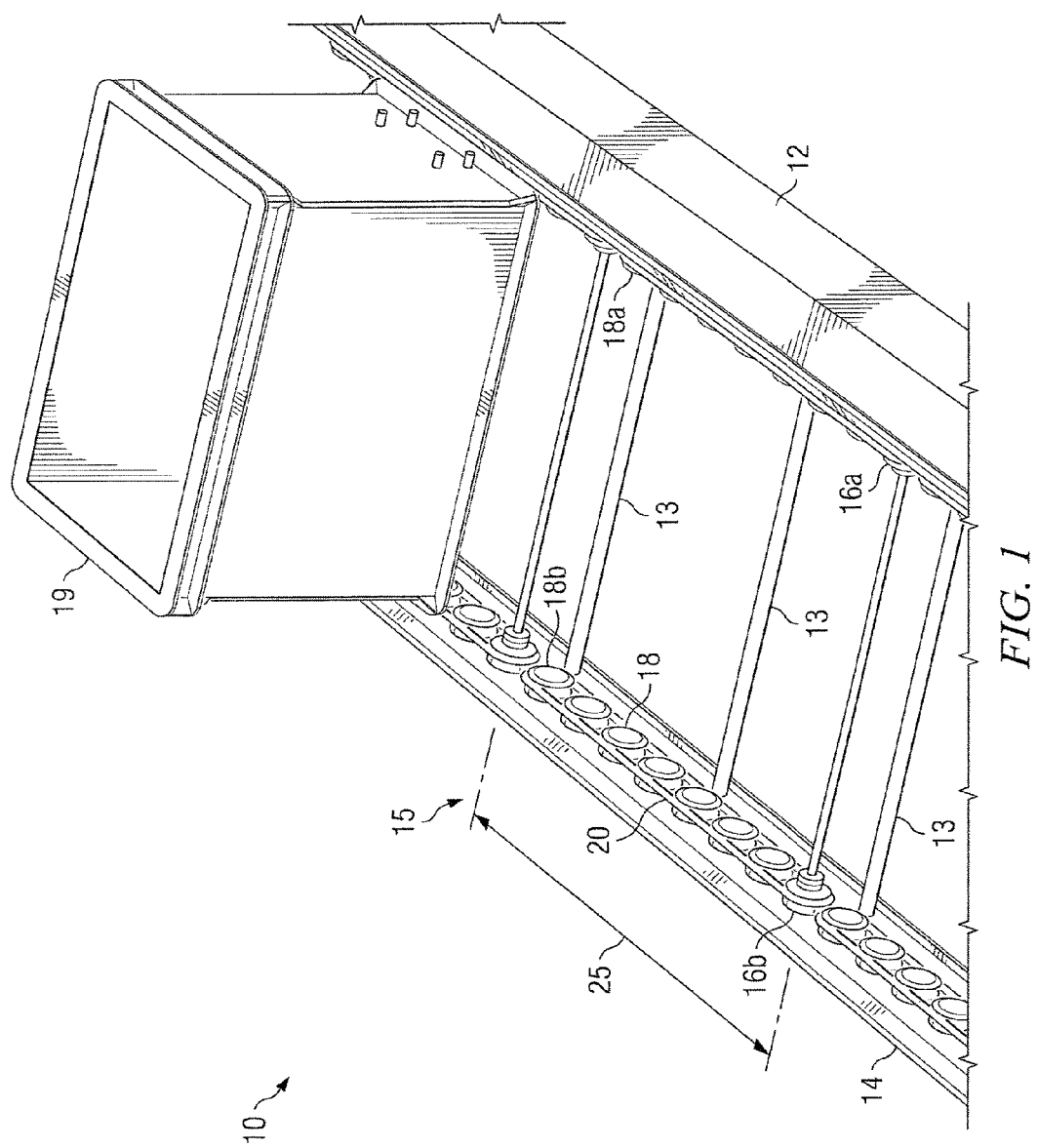
FIG. 1 shows a conveyor module having plural belt segments in accordance with the presently disclosed invention.
Figure 2:
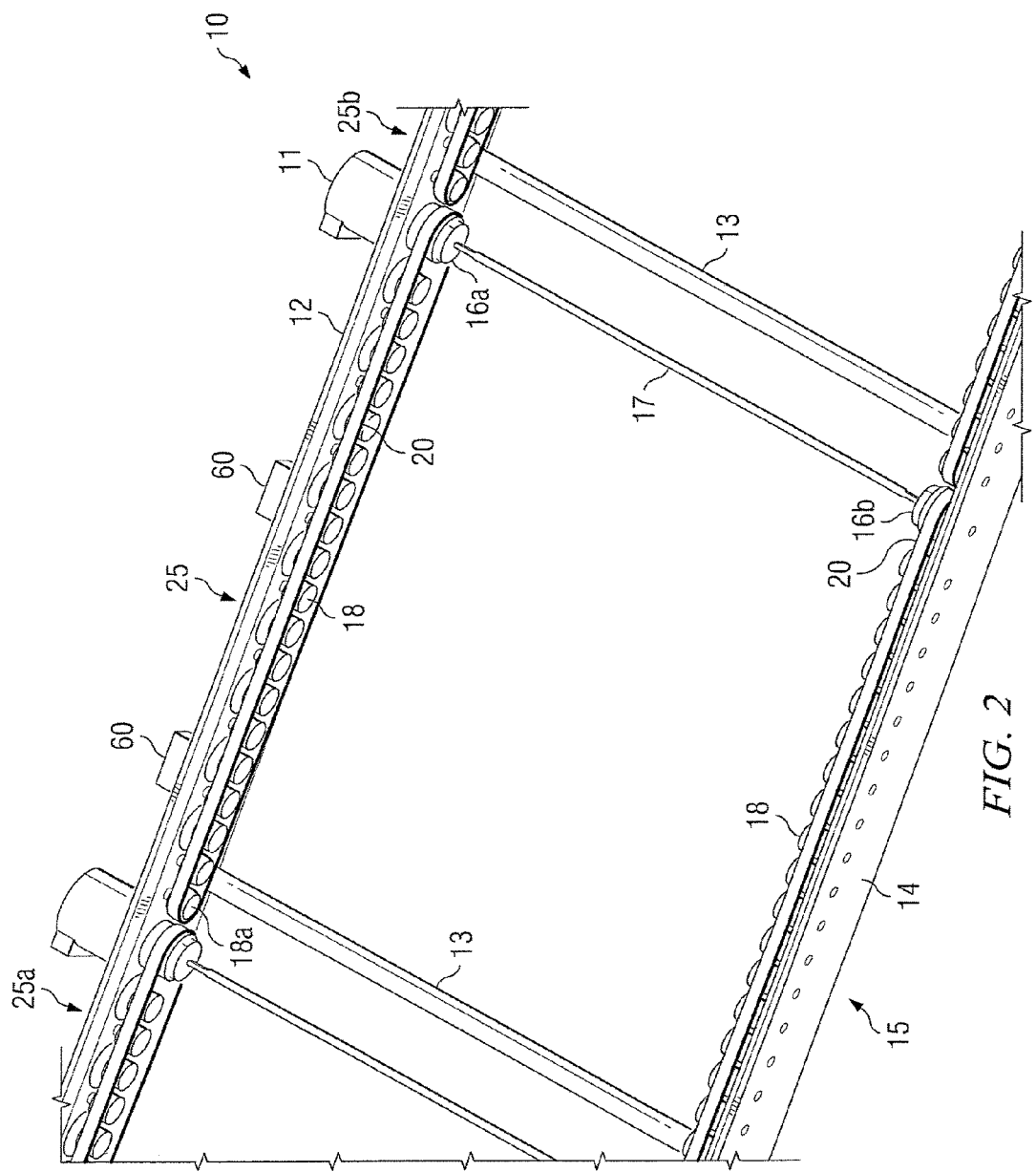
FIG. 2 shows a belt segment in accordance with the presently disclosed invention.

Referring to FIGS. 1 and 2, a belt-driven conveying system ("conveyor") will be described. The conveyor 10 includes a multiplicity of interconnected conveyor modules 15 having at least one belt-driven conveyor segment 25. The belt segments 25 and conveyor modules 15 can be structured and arranged in a myriad of patterns to satisfy local transportation and plant requirements. Each conveyor module 15 is internally segmented into unit length zones or belt segments 25, whose size (length and width) is determined by the dimensions of the work piece or by the object carrying a work piece 19. Indeed, the length of a conveyor module 15 is an integer multiplier of the length of each belt segment 25 within that module 15.

For example, if the dimension of the work piece or object carrying the work piece 19 is 0.5 meters in length and the conveyor module 15 is approximately two meters in length, a total of four autonomous, belt-driven conveyor segments 25, which are each slightly larger than the 0.5 meter length of the work piece or object carrying the work piece 19, would be needed per conveyor module 15. Those of ordinary skill in the art can appreciate that the size of the work piece or the object carrying the work piece 19, the length of the conveyor module 15, and the length of each belt segment 25 in each module are all variable.

Each belt segment 25 of each conveyor module 15 includes first and second side rails 12 and 14. The side rails 12 and 14 are structured and arranged to be mutually in parallel or substantially in parallel. The side rails 12 and 14 can be elevated to any desired height above a planar surface, e.g., a floor or slab, and/or suspended from an overhead structure, e.g., a ceiling or beams.

The first and second side rails 12 and 14 of each belt segment 25 are fixedly coupled, respectively, to first and second sides rails 12 and 14 of adjacent belt segments 25a and 25b in the same conveyor module 15. Furthermore, first and second side rails 12 and 14 of belt segments 25 located at the end of a conveyor module 15 are fixedly coupled, respectively, to first and second sides rails 12 and 14 of end portions of adjacent conveyor modules 15.

To alter the direction of flow of work pieces or objects carrying work pieces 19 or to branch the conveyor 10 in another direction(s), corner elements (not shown) are constructed on the basis of the length and width of the work piece or the object carrying the work piece 19, to allow free network configuration based on such mathematical modularity. Optionally, vertical lifts (not shown) can be outfitted with discrete belt segments 25 and/or conveyor modules 15, to allow vertical networking between conveyors 10 that are disposed at different elevations.

Each conveyor module 15 includes at least one lateral brace 13, which is structurally connected between parallel rails 12 and 14, to add structural support to the belt segment 25 and to the conveyor module 15. Although the lateral braces 13 shown in FIGS. and 2 are disposed orthogonal or substantially orthogonal to each of the side rails 12 and 14, struts for lateral bracing, instead, could be crossed, e.g., to form an X (not shown).

Belt segments 25 have modular dimensions that are predetermined according to the size (length and width) of a work piece and/or of an object carrying a work piece 19. Moreover, each belt segment 25 is structured and arranged to provide autonomous transport of a work piece and/or of an object carrying a work piece 19, to transport the work piece and/or the object carrying a work piece 19 from one end of the belt segment 25 to the other end. Accordingly, each belt segment 25 includes its own supporting and conveying means and its own driving means and, more specifically, each belt segment 25 includes a pair of drive belts and belt-supporting wheels, i.e., idler wheels 18, which physically support and convey the work piece and/or the object carrying the work piece 19, and a motor 11 and a pair of belt-driving wheels 16a and 16b that propel the pair of drive belts 20.

Belt Segment

As mentioned above, each belt segment 25 is structured and arranged to provide autonomous transport of a work piece and/or of an object carrying a work piece 19, to transport the work piece and/or the object carrying a work piece 19 from one end of the belt segment 25 to the other end. Accordingly, each belt segment 25 includes its own supporting and conveying means as well as its own driving means. The supporting and conveying means provide underlying indirect rolling support to the work pieces and/or to the objects carrying the work piece 19 and transport work pieces or objects carrying work pieces 19, e.g., pallets, boxes, and the like, from one end of the belt segment 25 to the other. The driving means is adapted to provide the inertial force necessary to drive the supporting and conveying means.

Figure 3:
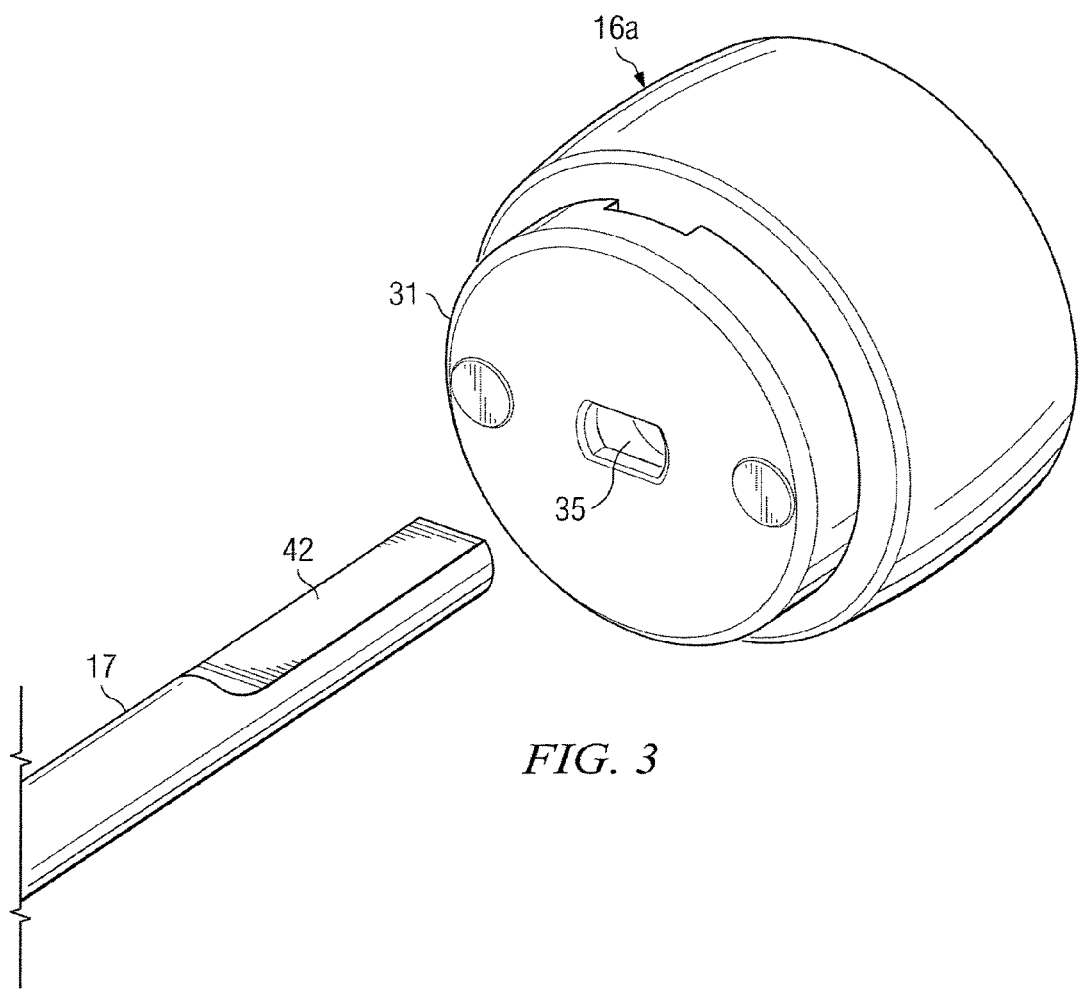
FIG. 3 shows a driving wheel in accordance with the presently disclosed invention.

Referring to FIGS. 2 and 3, an illustrative driving means is shown. The driving means can include a drive motor 11 and first and second belt driving mechanisms, each of which includes plural driving wheels 16a and 16b. The driving wheels 16a and 16b are disposed, respectively, on the first and second side rails 12 and 14. An extended drive shaft 17 is mechanically coupled to each of the driving wheels 16a and 16b.

The motor 11 is adapted to directly drive, i.e., rotate, one of the two driving wheels 16a and respective belt driving mechanism and to indirectly rotate the other driving wheel 16b and belt driving mechanism via the extended drive shaft 17. The belt-driving mechanisms are synchronized by the connecting drive shaft 17. Consequently, transported work pieces or objects carrying work pieces 19 rest on and are supported by the drive belts 20, which are synchronously driven. The connecting drive shaft 17 and its means of attachment to the driving wheels 16a and 16b must also meet design criteria, which excludes the generation of contaminating particulates. Accordingly, the designs described below are unique, because they allow the first and second conveyor rails 12 and 14 to be slightly out of alignment. As a result, the connecting drive shafts 17 may attach to each of the driving wheels 16a and 16b in a less than a perfectly orthogonal fashion.

Indeed, referring to FIG. 3, without the disclosed connecting drive shaft 17 and driving wheel 16a configuration, were the connecting drive shaft 17 to enter the driving wheels 16a and 16b at a non-orthogonal angle, rotation would induce strain on the shaft 17 and on the attachment flange, forcing one or both to wear excessively. To circumvent this problem, the ends 42 of the drive shaft 17 can be substantially flattened from the round. The flange attached to the wheel hub 31, can be structured and arranged to include a centrally positioned slot 35 to accommodate the flat ends 42 of the shaft 17. The slotted openings 35 in the flange are counter bored and rounded on the shaft entry side, to accommodate a less than orthogonal shaft 17 without strain. Rotating this assembly will then precess the shaft 17 in the slot 35 freely, eliminating or substantially eliminating any undesired material wear. Material selection is also important to minimize incident friction at the point of insertion of each slot 35.

Preferably, the motor 11 is coupled to a driving wheel 16 and the connecting drive shaft 17 via a magnetic hysteresis clutch that is integrated internal to the driving wheel 16. The magnetic hysteresis clutch allows different driving speeds between the drive belt 20 and the motor 11 during acceleration and deceleration. The variable load associated with each belt segment 25, e.g., fully-loaded, partially-loaded, and empty, affects the inertia of the work piece or object carrying the work piece 19.

The hysteresis clutch has an internal, rotary portion and an external clutch housing, which is the driving wheel 16 itself. The magnetic hysteresis clutch is adapted so that the internal, rotary portion is fixedly coupled to, i.e., pressed onto, the rotor or drive shaft of the motor 11 while, due to a magnetic hysteresis effect, the external, clutch housing portion (not shown) is free to rotate asynchronously on the same rotor or drive shaft. In this manner of operation, when desired, the motor 11 can continue to drive the internal, rotary part of the clutch while, at the same time, the external clutch housing portion is arrested from rotating.

The drive belts 20 are driven by each of the drive wheels 16a and 16b that are mechanically coupled to the external clutch housing portion. Hence, by engaging and disengaging the external clutch housing portion, the motor-clutch combination can be controlled to deliver limited driving torque to the belts 20 that is independent of speed. For example, if motor torque exceeds the retarding forces on the belts 20 and the external clutch housing portion, the clutch housing portion will de-synchronize from the motor drive shaft turning speed. As a result, the external clutch housing portion will rotate at the retarded speed of the spinning drive belt 20. Advantageously, while the clutch housing is de-synchronized and rotating at a retarded speed, it continues to exert a pre-established, constant driving torque.

The supporting and conveying means of each belt segment 25 includes a pair of rails 12 and 14 that are structured and arranged to structurally support the dead load of the driving and conveying means as well as the live load of a work piece and/or of any object carrying a work piece 19. The work pieces or objects that carry work pieces 19 are in direct contact with and ride directly on the pair of drive belts 20, which, when rotated by corresponding driving wheels 16a and 16b, move the work pieces or objects carrying work pieces 19 from one end of the belt segment 25 to the other end. The drive belts 20 travel along the idler wheels 18, which are adapted to rotate freely with the belts 20 without adding additional driving forces.

Each drive belt 20 is structured and arranged to journey over the freely-rotatable idler wheels 18. Idler wheels 18 are removably attached to the first and second side rails 12 and 14, e.g., using bearing combinations, screws, bolts or rivets having low-friction axles, and the like, so that the weight of the work pieces or objects carrying work pieces 19 is transferred to the first and second side rails 12 and 14 via the drive belt 20 and idler wheels 18. Idler wheels 18 are spaced along the side rails 12 and 14 at critical intervals, which are determined by the belt speed, vibration level, and other design requirements, as will be discussed further, below.

At one end of each of the first and second side rails 12 and 14 of each belt segment 25, opposite the driving wheels 16a and 16b, a pair of idler wheels 18a and 18b serves as a return means for the belt 20. The diameter of the return wheels 18a and 18b can be the same or substantially the same as the diameter of the driving wheel 16a or 16b and/or the idler wheels 18 or may be larger or smaller than both. Driving wheels 16a and 16b as well as the return idler wheels 18a and 18b can also be critically shaped to maintain central positioning and tracking of the drive belt 20.

Drive belt lengths are determined by the length of a belt segment 25 less the measure or amount of critical stretch of the elastic belt 20 for tensioning purposes. Wheel crown cross-sectional geometry for driving wheels 16 and idler wheels 18 is determined by the belt material, cross-sectional geometry, and the like. Exemplary combinations of various belts and wheel types will be described below.

Figure 4:
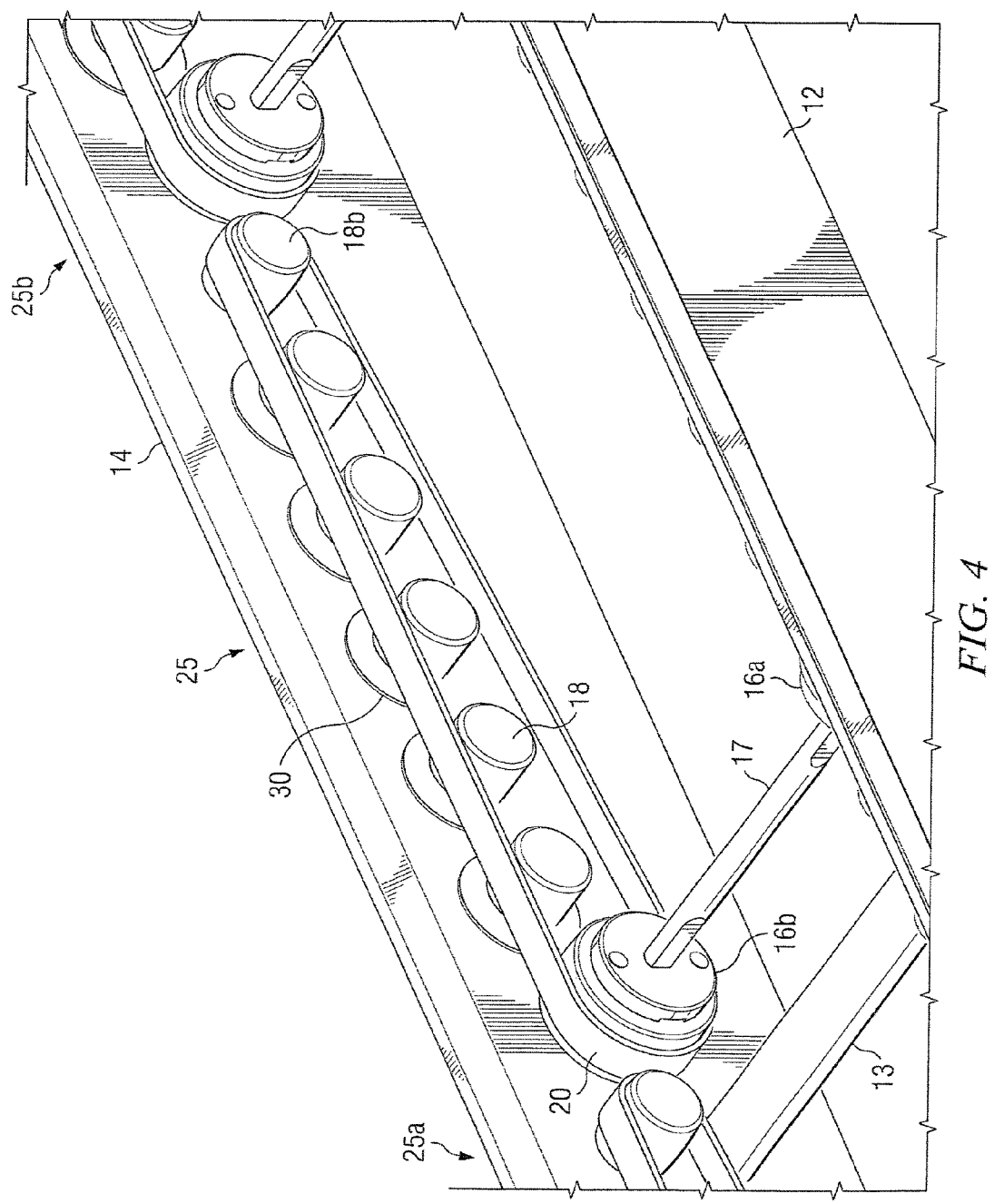
FIG. 4 shows a segment of a belt-driven conveyor in accordance with the presently disclosed invention.

Referring to FIG. 4, there is shown a clutch-driven primary driving wheel 16b that has a relatively smooth, centering-crown machined onto its outer periphery. The centering-crown is adapted to center a relatively flat, relatively thin, elastic belt 20. The drive belt 20 is returned at one end of the belt segment 25 using a similarly-crowned and similarly-flanged return idler wheel 18b.

Between the pair of driving wheels 16a and 16b and their corresponding return wheels 18a and 18b, the drive belt 20 journeys on smaller idler wheels 18 that include a flange 30. The flanged idler wheels 18 are structured and arranged to laterally contain the work piece or object carrying the work piece 19.

A relatively thin belt thickness is desirable because, although the idler wheels 18 rotate at the same rate, those portions of the idler wheel 18 closer to the axis of rotation. i.e., at or near the root, rotate more slowly relative to portions of the idler wheel 18 that are disposed farther from the axis of rotation. As a result, any difference in the velocities of two surfaces on the flange 30 that contact the work piece or object carrying the work piece 19 may result in undesirable rubbing, which may result in frictional particulation. Consequently, relatively thin, relatively flat drive belt 20 cross sections are more desirable, to reduce the velocity differential between potential points of contact of the work piece or the object carrying the work piece 19 and to maintain required cleanliness levels.

Figure 5:
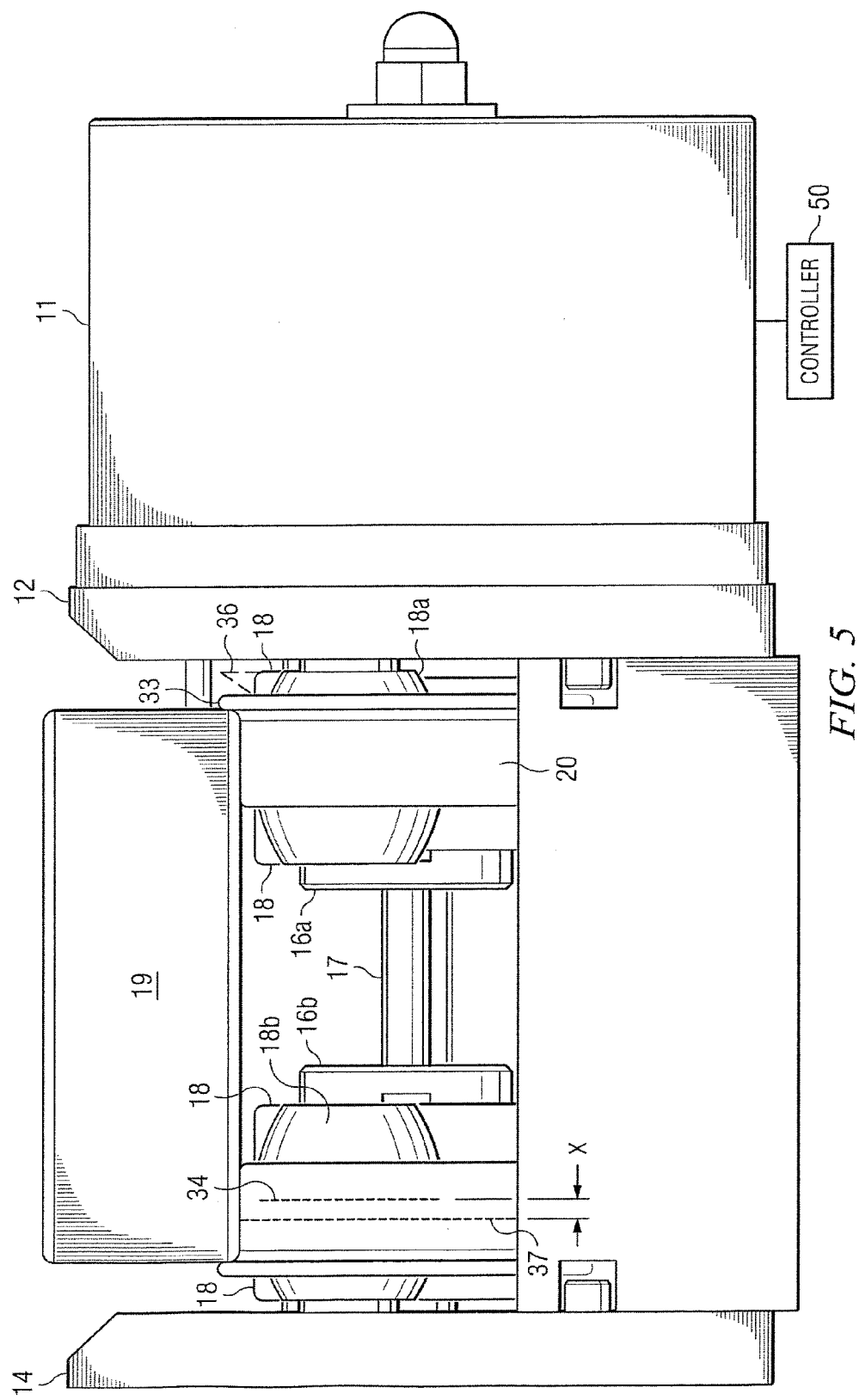
FIG. 5 shows a segment of another belt-driven conveyor in accordance with the presently disclosed invention.

Referring to FIG. 5, there is shown a cross-sectional view of another embodiment of a belt segment 25 for a system 10 as seen from the return idler wheel end of the belt segment 25. The motor 11 is mechanically coupled to one of the driving wheel 16a via a magnetic hysteresis clutch. The driving wheels 16a and 16b (at the far end of the figure) drive an L-shaped or substantially L-shaped belt 20 that includes a raised edged section 33. The long leg of the "L" is disposed on and generally in the plane of the peripheral surface of the wheels while the short leg of the "L" is orthogonal or substantially orthogonal thereto. The confining flanges 33 on the L-shaped belt are structured and arranged to laterally confine the work piece or object carrying the work piece 19 therebetween.

Between the driving wheels 16a and 16b and respective return idler wheels 18a and 18b there are plural idler wheels 18 that, optionally, may include a confining flange 36 (shown in phantom). When a flange 36 is included with the idler wheels 18, the bottom, outside corner of the L-shaped belt 20 is guided by the idler wheels 18 at their root.

In this second embodiment, each of the pair of driving wheels 16a and 16b and the pair of return wheels 18a and 18b are machined to include belt-centering crowns on an outer peripheral surface on which the belt 20 travels. Because the cross-section of the L-shaped belt 20 is not uniform, the centers of the crown radius 34 machined on the driving wheels 16a and 16b and on the return idler wheels 18a and 18b are slightly offset relative to the centerline 37 of the drive belt 20 by a distance x, to center the drive belt 20 properly. The dimension of the offset x is determined by the material of the belt, the belt thickness, and so forth.

Figures 6A, 6B:
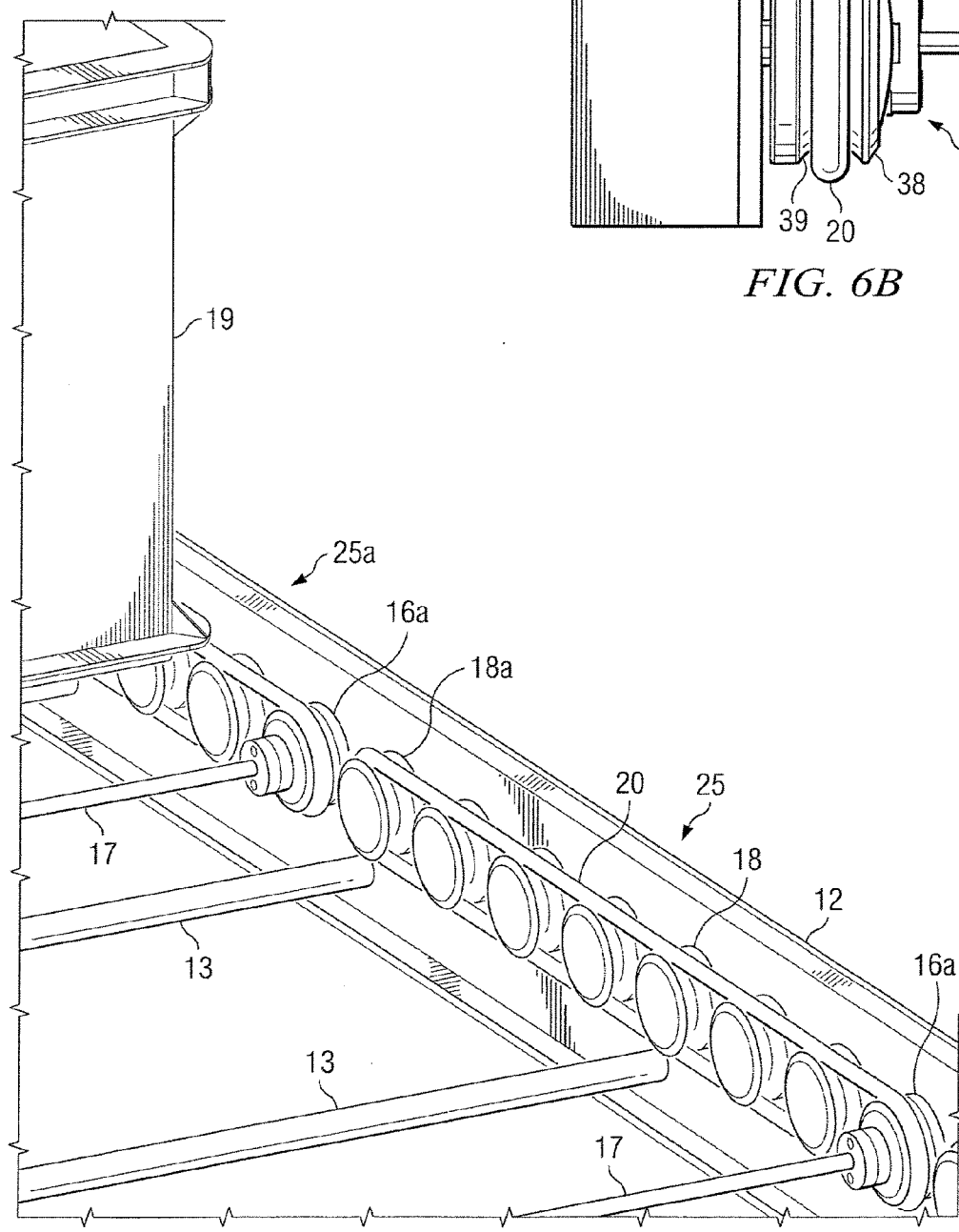
FIG. 6A shows a segment of yet another belt-driven conveyor in accordance with the presently disclosed invention.
FIG. 6B shows a detail of a driving wheel for the belt segment shown in FIG. 6A.

Referring to FIG. 6A and FIG. 6B, there is shown a belt segment 25 having relatively thin, rounded or substantially rounded, elastic drive belts 20 that are tightly stretched between driving wheels 16a and 16b, which are disposed at one end of the belt segment 25, and corresponding return idler wheels 18a and 18b, which are disposed at the other end of the belt segment 25. A first driving wheel 16a is directly propelled by a motor 11 via an internal hysteresis clutch. A second driving wheel 16b is indirectly propelled by a motor 11 coupled thereto by the internal hysteresis clutch and via the drive shaft 17. Between the pair of driving wheels 16a and 16b and respective pair of return idler wheels 18a and 18b are disposed plural idler wheels 18 for guiding the drive belt 20 and for supporting the weight of the work piece or object carrying the work piece 19.

All of the wheels are machined to include a relatively smooth, reverse or negative crown 38 in their outer peripheries. The negative crown 38 is adapted to center and retain the rounded or substantially rounded belt 20 cleanly, owing to the crown radius 39. Preferably, the radius 39 is larger then the radius of the drive belt 20, to minimize cross motion of belt and wheel surfaces, which ensures particulate-free motion.

Figure 7:
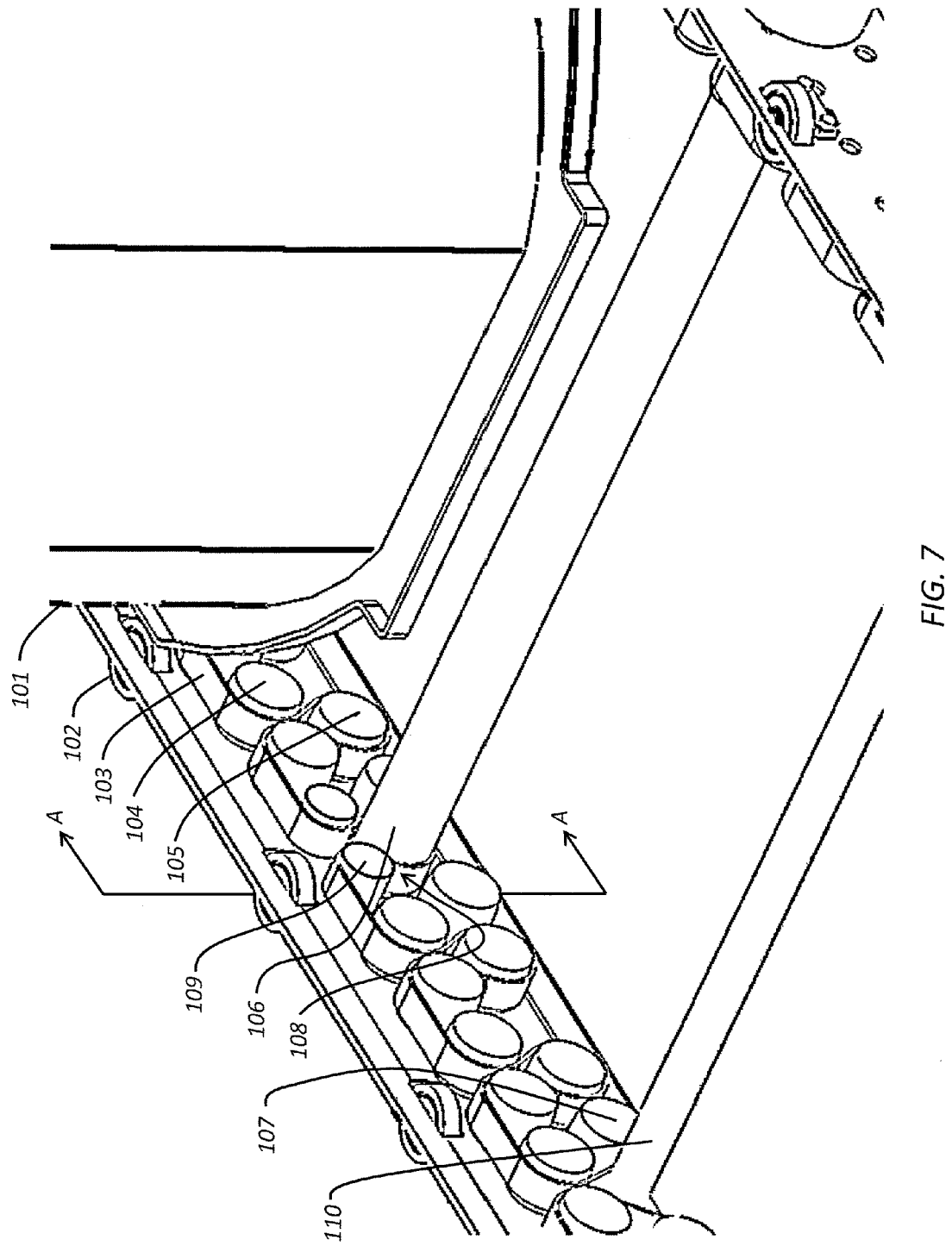
FIG. 7 is a perspective view of a portion of a conveyor segment providing a serpentine belt path in accordance with an embodiment of the presently disclosed invention.

As an alternative to the use of an L-shaped belt 20, as shown in FIG. 5, or idler wheels 18a, 18b having a confining flange 36, as shown in FIG. 4, lateral guide wheels 102 may be provided, as shown in FIG. 7. Such guide wheels are preferably provided with a resilient, somewhat pliable outer surface to avoid jarring a work piece coming into contact therewith. While effective at confining the work piece to an optimal travel path, the provision of such lateral guide wheels in all or substantially all of the conveyor segments may become costly to implement. However, the use of lateral guide wheels eliminates the need for an L-shaped belt or idler wheels with a confining flange. Of course, any combination of an L-shaped belt, idler wheels with a confining flange, and lateral guide wheels may be provided, though the functions of each could be regarded as redundant when so combined.

Despite the reduction in particulation achieved through the use of an L-shaped belt or lateral guide wheels, there remains another source of particles that has not heretofore been addressed. As is evident in the views of FIGS. 1, 2, 4, and 6A, each of the depicted belts passes between a driving wheel, for example driving wheel 16a, and a return wheel, for example, return wheel 18a. In between, there may be a plurality of idler wheels, such as idler wheels 18, adapted to support a work piece 101 as it passes thereabove. Regardless of the diameter of the driving wheel and/or return wheel relative to the idler wheels, there remains the opportunity for the belt to slip across the surface of one or more of the idler wheels, especially when not loaded by a work piece. When not actively engaged by the belt, the rate of rotation of an idler wheel may begin to slow. When re-engaged by the belt, the idler wheel peripheral velocity is less than the linear velocity of the belt. When a work piece passes along the conveyor segment, it forces the belt into contact with the idler wheel and so accelerates the idler wheel up to the belt speed. Frictional particles may thus be generated due to the initial difference in velocity.

Figure 8:
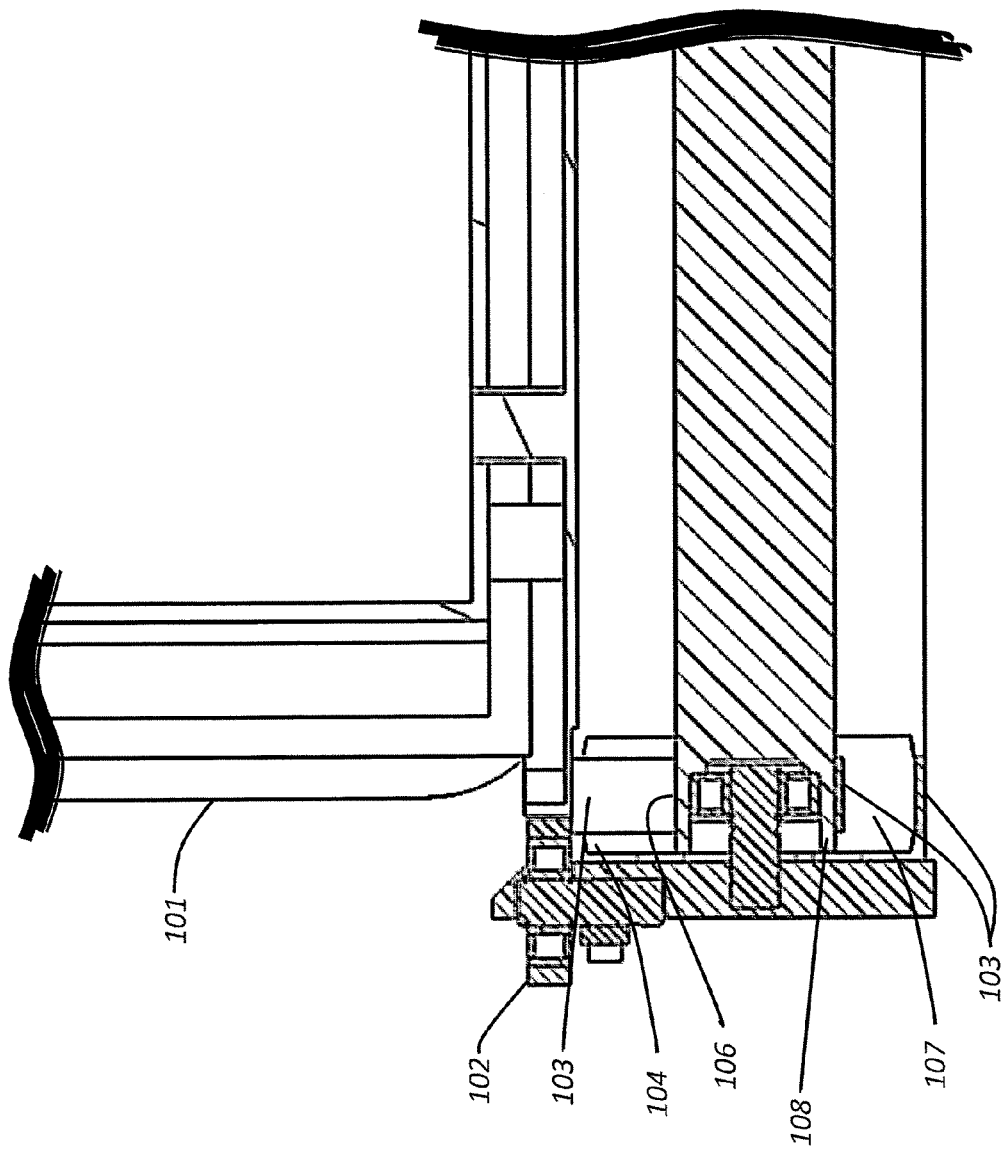
FIG. 8 is a cross-sectional view of a portion of the conveyor segment of FIG. 7.
Figure 9:
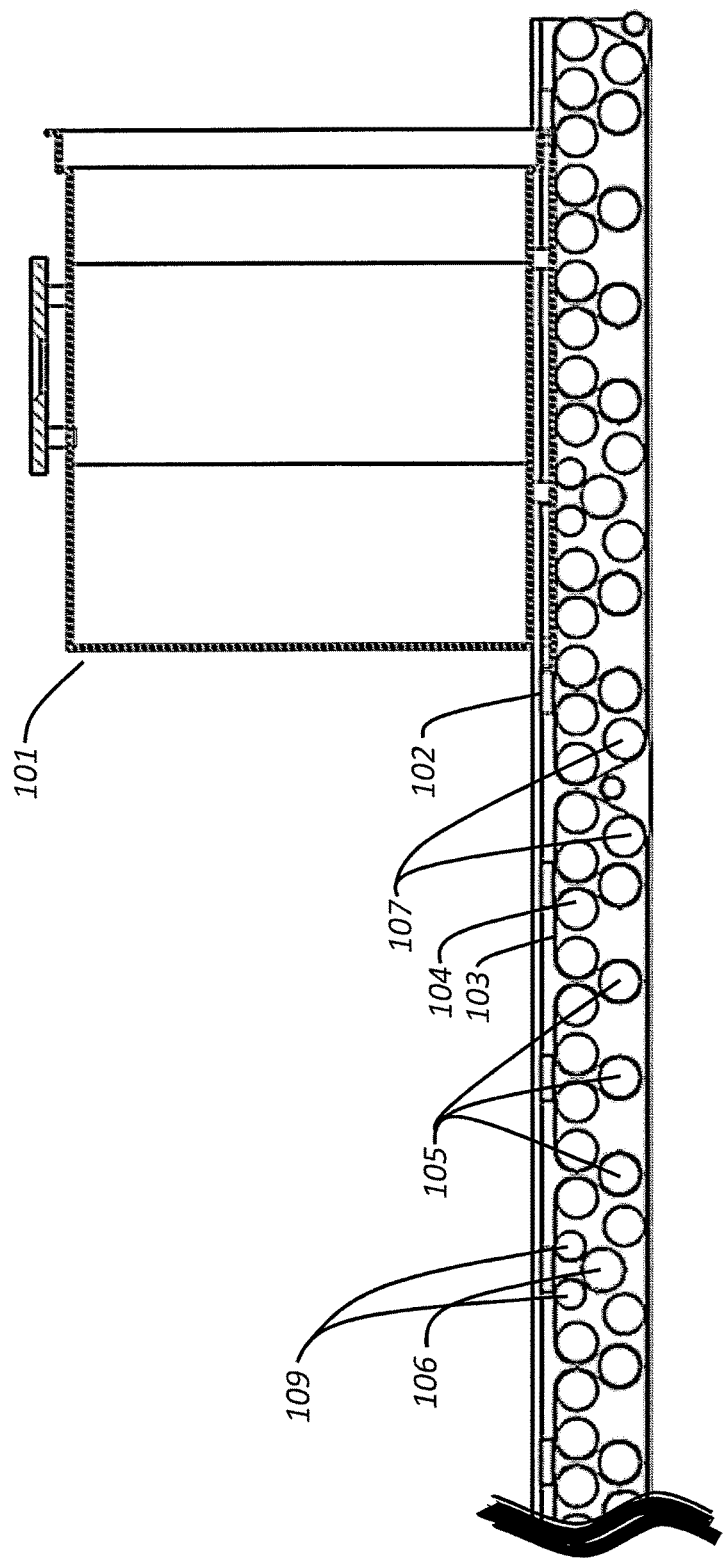
FIG. 9 is a schematic side view of plural conveyor segments in accordance with the embodiment of FIG. 7.

To prevent such intermittent contact between belt and idler wheels, a further embodiment of the presently disclosed system and method, as shown in FIGS. 7-9, employs a serpentine belt. Specifically, a drive belt 103 is disposed about upper idler wheels 104, lower loop-back idler wheels 105, and driving wheels 108 attached to a respective drive shaft 106.

FIG. 7 depicts a portion of one side of a conveyor segment. A work piece 101, such as a 300 mm FOUP, is shown on a portion of the segment, and as illustrated would be moved on the opposing belts 103 from the upper right corner of the figure to the lower left corner. Lateral guide wheels 102 are disposed in the side wall on each side of the conveyor segment. Multiple free-turning upper idler wheels 104 and lower loop-back wheels 105 are illustrated. A driving wheel 108 attached to a drive shaft 106 is also depicted, as are return idler wheels 107. It is to be understood that a similar configuration of idler wheels and driving wheel is disposed on the side wall in the foreground of FIG. 7. FIG. 8 is a cross-sectional view through the conveyor segment of FIG. 7 taken along lines A-A. FIG. 9 is a side schematic view of multiple sequential conveyor segments, illustrating the belt 103 path of travel through the various idler and driving wheels in one embodiment.

Preferably, as shown in FIGS. 7 and 9, the belt 103 passes over the upper side of two upper idler wheels 104, down around the forward side of the forwardmost of these two upper idler wheels, around the rearward, lower, and forward sides of a lower loop-back wheel 105, then back up to the rearward and upper sides of the next upper idler wheel. Thus, the belt passes over two upper idler wheels, down and around a lower loop-back wheel, then back over the next two upper idler wheels.

In the illustrated embodiment, then, the belt is in contact with over 25% of the peripheral surface area of each of the upper idler wheels making up a pair of upper idler wheels. The belt is also in contact with over 50% of the peripheral surface area of the lower loop-back wheels and of the driving wheel. The belt is also in contact with less than 25% of the peripheral surface area of each of the return idler wheels.

At certain intervals between pairs of upper idler wheels, the belt passes down and around a driving wheel 108 instead of a lower loop-back wheel. As with the driving wheels of the previously described embodiments, the driving wheels of FIGS. 7-9 are preferably connected together by a drive shaft 106 in order that the driving wheels on either side of a conveyor segment are rotating at the same speed. Here, the drive shaft is depicted as a simple cylinder, though it is understood that the drive shaft can take one of a variety of forms, such as the connecting drive shaft 17 of FIGS. 3 and 4. Thus, the belt is held into positive contact with each of the upper idler wheels 104 regardless of whether a work piece 101 is riding on that portion of the belt 103.

The driving wheels 108 and drive shaft 106 may be disposed at any suitable location within a conveyor segment. However, it may be preferable to provide the driving wheels closer to the center of the respective conveyor segment.

As shown in FIGS. 7 and 9, the upper idler wheels 109 adjacent the driving wheel 108 have a smaller diameter in order to accommodate the driving wheel 108. In embodiments where there is a greater amount of space between wheels, there need not be this difference in diameter.

At selected positions, the belt passes from the forward side of an upper idler wheel 104 to a return idler wheel 107 that has a lower surface below that of each lower loop-back wheel. Another return idler wheel is disposed at the opposite end of the respective conveyor segment and guides the belt up into contact with the rearmost upper idler wheel in that conveyor segment. Optionally, one or more additional return idler wheels may be disposed along the length of the respective conveyor segment to guide the belt as it travels in the direction opposite to that of work piece movement. At least one cross-beam 110 used to maintain the alignment between the two sides of the conveyor segment is also shown in FIG. 7.

As is evident from the drawings, the upper idler wheels, lower loop-back wheels and return idler wheels are disposed on the respective side rail of the conveyor segment via shafts that extend orthogonal to, or substantially orthogonal to, the respective side rail, thereby enabling the wheels to rotate in a plane substantially parallel to the respective side rail. As described, the driving wheels are similarly mounted, though the driving wheels on opposite sides of the conveyor segment are connected by the drive shaft.

The number of upper idler wheel pairs per conveyor segment may be selected depending upon factors such as segment length, belt material, belt thickness, driving wheel hysteresis clutch characteristics, etc. The length of each belt segment on a linear conveyor is determined by the dimensions of the work piece to be transmitted. In a typical practical application, a conveyor segment transporting 300 mm FOUP is 0.5 m long.

In earlier described embodiments, driving and select idler wheels are provided with centering crowns in order to keep the belt approximately centered on each driving and return idler wheel. However, if any of the shafts for wheels having crowns are not orthogonal to the direction of belt and work piece travel, the belt may travel in slightly eccentric paths across the outer periphery of the respective wheel surface, rather than along the optimal path otherwise defined by the crown. As a result, the respective wheel may rotate at a speed that may be different from the complementary wheel on the opposite side of the conveyor segment. This results in frictional slip under the directly carried work piece, generating some non-negligible degree of particulation. To address this possible source of contamination in the embodiment of FIGS. 7-9, crowns are preferably disposed only on idler wheels.

Controller

Control of the asynchronous movement and flow of the work piece or object carrying the work piece 19 can be achieved by embedding a microcontroller or a network of microcontrollers in the conveyor body. The controller 50 (FIG. 5) includes hardware or software applications to execute fundamental transport logic, such as asynchronous flow and soft accumulation, i.e., without bumping, linear drive and speed regulation, acceleration and deceleration of the work piece or object carrying the work piece 19, logic controlling the branching into and merging from plural flow, as well as for tracking the work piece or object carrying the work piece 19 from a source or point of entry to a destination or exit point. Asynchronous flow on the internally segmented conveyor 10 follows the embedded logic where each belt segment 25 is capable of sensing the presence of a work piece or of an object carrying a work piece 19 and allows work piece or object carrying the work piece 19 entry from a direction of upstream flow if, and only if, that belt segment 25 is confirmed to be vacant and available, which is to say empty of any work piece or object carrying the work piece 19. Such logic inherently promotes linear movements and soft accumulation of work pieces or objects carrying the work pieces 19.

An even further improvement on the above control logic includes the preferential movement of work pieces or objects carrying work pieces 19 towards belts segments 25 that are in the process of evacuating a respective work piece or object carrying a work piece 19. The improved logic allows higher throughput by increasing flow density on the conveyor 10 and, further, includes time and distance calculation of physical positions of discrete work pieces or objects carrying the work pieces 19. Such an improved algorithm can be enhanced by the addition of additional sensors 60 (FIG. 2) on each belt segment 25 of the conveyor 10, which enables more precise location of discrete work pieces or objects carrying work pieces 19, than the original segments would allow.

A further improvement towards higher density and higher throughput would be the mechanical reduction of the belt segment 25 size. The reduction would mean zone segment size less than that of work pieces or objects carrying the work pieces 19, but still an integral fraction of it.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What is claimed is:

1. A conveyor segment for clean manufacturing applications, the conveyor segment comprising:
 a pair of mutually parallel side rails;
 a pair of autonomous belt-drives for transporting at least one work piece from a first end of the belt segment to a second end of the belt segment, each belt-drive being disposed in parallel or substantially in parallel with a respective one of the pair of side rails, each belt-drive comprising
  plural pairs of upper idler wheels disposed at substantially the same height along the respective side rail,
  a plurality of lower loop-back wheels, each disposed intermediate two respective pairs of upper idler wheels and disposed lower, along the respective side rail, than the two respective pairs of upper idler wheels,
  a driving wheel disposed intermediate two respective pairs of upper idler wheels and disposed lower, along the respective side rail, than the two respective pairs of upper idler wheels,
  a first return idler wheel disposed proximate the first end of the belt segment and a second return idler wheel disposed proximate the second end of the belt segment, the first and second return idler wheels both disposed lower, along the respective side rail, than the plurality of lower loop-back wheels and the driving wheel, and
  a continuous belt having a substantially planar cross-section,
  wherein the belt is disposed in contact with, in sequence: an upper surface of a first pair of upper idler wheels; a lower surface of a respective one of the plurality of lower loop-back wheels or the driving wheel; and an upper surface of the next, consecutive one of the plural pairs of upper idler wheels,
  wherein the belt is disposed in contact with, in sequence: an upper surface of the pair of upper idler wheels most proximate the second end of the belt segment; a lower surface of the second return idler wheel; a lower surface of the first return idler wheel; and an upper surface of the pair of upper idler wheels most proximate the first end of the belt segment,
 wherein the upper idler wheels, lower loop-back wheels, and return idler wheels all are adapted to rotate in a plane that is substantially parallel to the respective side rail.

2. The conveyor segment of claim 1, wherein the outer periphery of each of the upper idler wheels, lower loop-back wheels, and return idler wheels has a crown for centering the belt thereon.

3. The conveyor segment of claim 2, wherein the crowns of each of the idler wheels, lower loop-back wheels, and return idler wheels are substantially co-planar.

4. The conveyor segment of claim 1, further comprising at least one intermediate return idler wheel disposed between the first and second return idler wheels and disposed with respect to the respective side rail at substantially the same height as the first and second return idler wheels.

5. The conveyor segment of claim 1, wherein each belt-drive further comprises plural lateral guide wheels disposed in conjunction with the respective side rail for selective peripherally rolling contact with a work piece passing through the conveyor segment, the axis of rotation of each of the plural lateral guide wheels being substantially orthogonal to the direction of work piece travel through the conveyor segment.

6. The conveyor segment of claim 1, wherein the outer surface of the driving wheel of each belt-drive is substantially cylindrical.

7. The conveyor segment of claim 1, wherein the belt is in contact with over 25% of the peripheral surface area of each of the upper idler wheels making up each pair of upper idler wheels, in contact with over 50% of the peripheral surface area of the lower loop-back wheels and of the driving wheel, and in contact with less than 25% of the peripheral surface area of each of the return idler wheels.

8. A method of conveying a work piece on a conveyor segment, each conveyor belt segment further comprising a pair of mutually parallel side rails, a pair of autonomous belt-drives for transporting at least one work piece from a first end of the belt segment to a second end of the belt segment, each belt-drive being disposed in parallel or substantially in parallel with a respective one of the pair of side rails, each belt-drive comprising plural pairs of upper idler wheels disposed at substantially the same height along the respective side rail, a plurality of lower loop-back wheels, each disposed intermediate two respective pairs of upper idler wheels and disposed lower, along the respective side rail, than the two respective pairs of upper idler wheels, a driving wheel disposed intermediate two respective pairs of upper idler wheels and disposed lower, along the respective side rail, than the two respective pairs of upper idler wheels, a first return idler wheel disposed proximate the first end of the belt segment and a second return idler wheel disposed proximate the second end of the belt segment, the first and second return idler wheels both disposed lower, along the respective side rail, than the plurality of lower loop-back wheels and the driving wheel, and a continuous belt having a substantially planar cross-section, the method comprising for each belt-drive:

disposing the belt in contact with, in sequence: an upper surface of a first pair of upper idler wheels; a lower surface of a respective one of the plurality of lower loop-back wheels or the driving wheel; and an upper surface of the next, consecutive one of the plural pairs of upper idler wheels; and disposing the belt in contact with, in sequence: an upper surface of the pair of upper idler wheels most proximate the second end of the belt segment; a lower surface of the second return idler wheel; a lower surface of the first return idler wheel; and an upper surface of the pair of upper idler wheels most proximate the first end of the belt segment.

9. The method of claim 8, further comprising providing a crown on each of the upper idler wheels, lower loop-back wheels, and return idler wheels has a crown for centering the belt thereon.

10. The method of claim 8, further comprising providing at least one intermediate return idler wheel disposed between the first and second return idler wheels and disposed with respect to the respective side rail at substantially the same height as the first and second return idler wheels.

11. The method of claim 8, further comprising providing each belt-drive with plural lateral guide wheels disposed in conjunction with the respective side rail for selective peripherally rolling contact with a work piece passing through the conveyor segment, the axis of rotation of each of the plural lateral guide wheels being substantially orthogonal to the direction of work piece travel through the conveyor segment.

12. The method of claim 8, further comprising disposing the belt: in contact with over 25% of the peripheral surface area of each of the upper idler wheels making up each pair of upper idler wheels; in contact with over 50% of the peripheral surface area of the lower loop-back wheels and of the driving wheel; and in contact with less than 25% of the peripheral surface area of each of the return idler wheels.

\* \* \* \* \*